United States Patent [19]
Garcea

[11] 3,742,712
[45] July 3, 1973

[54] DEVICE FOR THE TIMED INJECTION OF AIR INTO THE EXHAUST DUCTS OF AN INTERNAL COMBUSTION ENGINE

[75] Inventor: Giampaolo Garcea, Milan, Italy
[73] Assignee: Alfa Romeo S.p.A., Milan, Italy
[22] Filed: Apr. 19, 1971
[21] Appl. No.: 135,025

[30] Foreign Application Priority Data
Apr. 22, 1970 Italy.............................. 23651 A/70

[52] U.S. Cl..................................... 60/294, 60/305
[51] Int. Cl........................................... F02b 75/10
[58] Field of Search....................... 60/294, 304, 305, 60/307, 317

[56] References Cited
UNITED STATES PATENTS
3,147,588   9/1964   Tauschek............................. 60/294
3,537,257   11/1970   Webster................................. 60/305

FOREIGN PATENTS OR APPLICATIONS
722,329   12/1931   France.................................. 60/304
360,382   12/1931   Great Britain......................... 60/304

Primary Examiner—Douglas Hart
Attorney—Holman & Stern

[57] ABSTRACT

A device for injecting air so as to admix same with the exhaust gases of an internal combustion engine to reduce the emission of pollutants in the atmosphere. The injection is caused to take place in the immediate vicinity of the exhaust valve, and a kind of slide valve is obtained, by suitably shaping the valve stem and the valve guide, so as to inject the diluent air when the exhaust valve is open and to prevent such an injection when the exhaust valve is closed. By so doing, air is admixed with the exhaust gases in timed sequence and when the exhaust gases still retain their own sensible heat.

5 Claims, 6 Drawing Figures

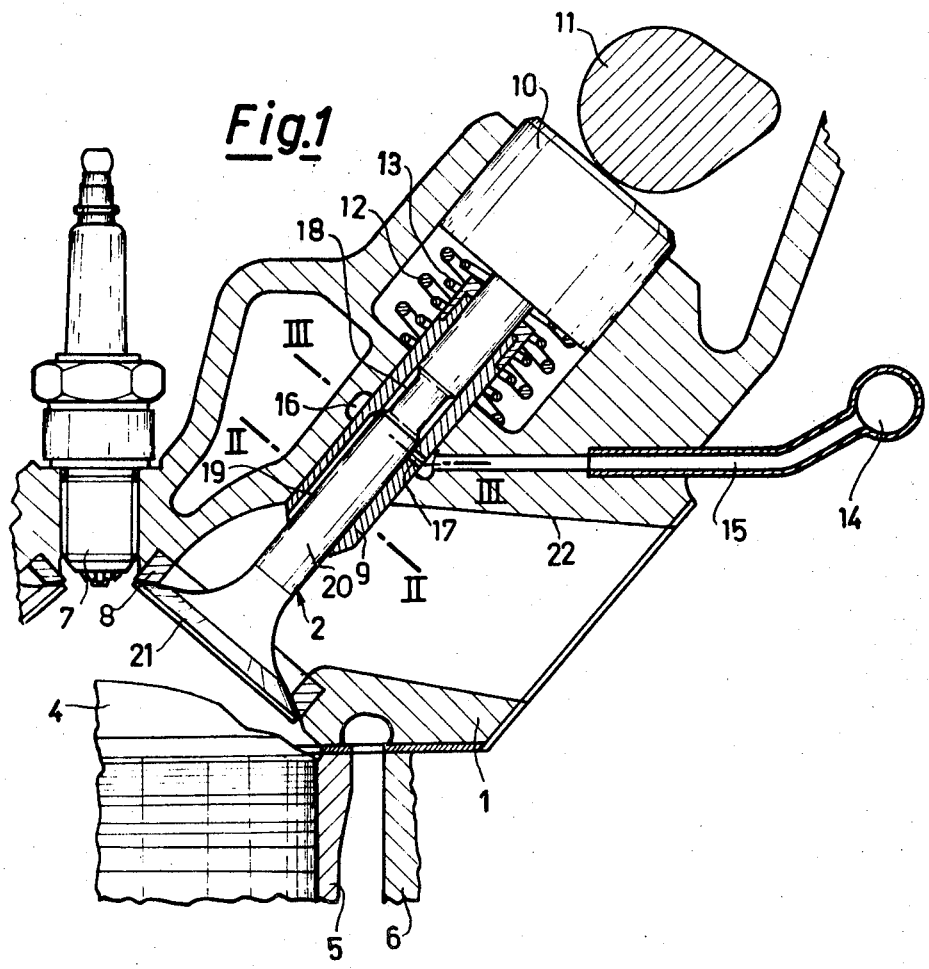
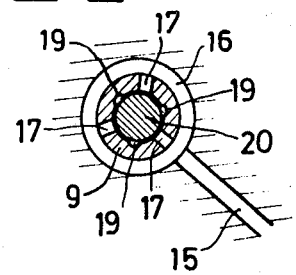
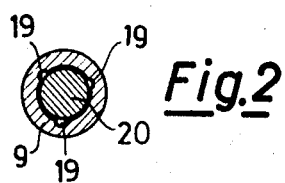

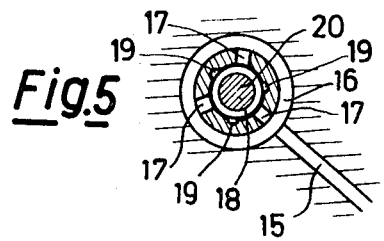
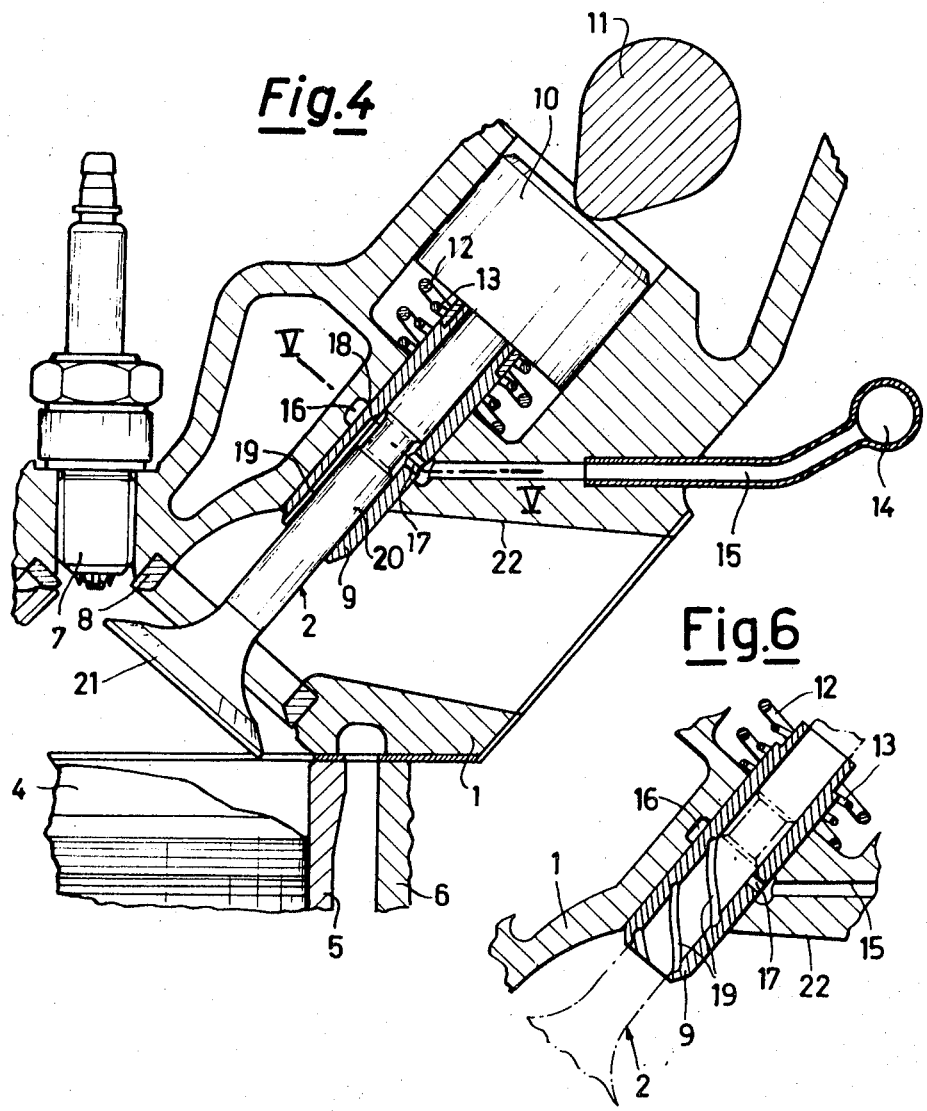

DEVICE FOR THE TIMED INJECTION OF AIR INTO THE EXHAUST DUCTS OF AN INTERNAL COMBUSTION ENGINE

BACKGROUND OF THE INVENTION

The invention relates to means for the timed injection of air into the exhaust ducts of an internal combustion engine for reducing the emission of pollutants into the atmosphere.

It is known that, by injecting air into the exhaust ducts of an internal combustion engine so as to admix the air to the exhausts, a further oxidation of carbon monoxide can be achieved, and of the unburned hydrocarbons as contained in said exhausts. The result is a reduced evolution of pollutants by the engine into the ambient atmosphere. In order that the oxidation may be encouraged, it is desirable that the exhaust be still very hot: for this reason air is injected in each of the exhaust ducts as formed in the engine head, in an area which is very close to the exhaust valve.

It is likewise known that the emission of pollutants can further be reduced if, in lieu of a continuous injection of air, an intermittent injection is adopted, which is properly timed relative to the exhaust stages of the individual cylinders. By so doing, savings of air can also be achieved and thus a decrease of both the size of the air pump and the power requirement for driving the latter.

SUMMARY OF THE INVENTION

It is the subject matter of the present patent application to provide a device for practicing said intermittent and timed air feed, said device utilizing the exhaust valve itself of each individual cylinder and the usual reciprocal opening motion of the valve, as controlled by the engine camshaft. It is desirable, in fact, that the air, as it comes from a pump through a duct under pressure, be injected into the duct just during the exhaust stage of the cylinder, so that the exhaust valve as modified according to the present invention, as it is being opened to allow the emission of the exhausts from cylinder into the exhaust duct, simultaneously opens a flow cross-section for introducing into the exhaust duct the air fed by the pump. When the exhaust valve is closed, the flow cross-section is also closed and the rate of flow of air is zero.

More particularly, according to the present invention, the task of the timed injection of air is fulfilled by a device which comprises the exhaust valve itself, which is properly modified in the vicinity of the valve stem, and the valve guide, also appropriately modified.

In a particularly advantageous embodiment of the device according to the invention, as shown in the accompanying drawings, the several requirements stemming from the following operative situations have duly been taken into account, viz.:

a. On account of the shape of the outflow cross-section for the exhausts as the valve is opened, the exhaust stream is predominantly directed towards the valve guide end. Thus, it is desirable that air be injected at the end of the guide valve so as to encourage the admixture of air with the exhausts, immediately and to the highest degree.

b. The air valve should be of the slide valve type. The closure should not be embodied by an abutment against a seating since such an abutment could highly impair the abutment of the exhaust valve against its seating in the engine head, and thus could jeopardize the tight seal of the closed exhaust valve.

c. The slide valve should not be positioned in the area where the valve stem emerges from the valve guide when the valve is open, to prevent the formation of deposits due to the exhausts on the slide valve edges, thus preventing the valve from returning to its valve guide.

d. A considerable amount of heat is removed, as is known, from the valve due to the contact of the valve with its guide; it is less widely known that such an amount of heat is removed immediately in the first two or three millimeters of the guide, starting from the outer edge thereof. The result is that this edge which contacts the stem should not be far from the valve head so as to prevent valve overheating.

e. In connection with (d) above, the modification of the valve stem (which involves a diameter reduction and thus a decrease of the flow passage area for heat) should be carried out in an area of the stem which is enough internal with respect to the valve guide as the heat coming from the valve head may be transferred to the valve guide without interferring with the modified stem area.

f. The spontaneous rotation of the exhaust valve during operation, a rotation which, as is known, contributes towards ensuring the seal at the seating with the lapse of time, should not impair the magnitude or the direction of the injected airstream.

What has been said hereinbefore will be better understood with reference to the drawings, wherein:

BRIEF DESCRIPTION OF THE DRAWINGS

FIG. 1 is a partial cross-sectional view of an engine head to which the device according to the invention has been applied.

FIG. 2 is a cross-sectional view, taken along the line II—II of FIG. 1.

FIG. 3 is a cross-sectional view, taken along the line III—III of FIG. 1.

FIG. 4 is a partial cross-sectional view similar to FIG. 1, in the exhausting position.

FIG. 5 is a cross-sectional view, taken along the line V—V of FIG. 4 and,

FIG. 6 is a detail in cross-section which illustrates an alternative embodiment of the invention.

DETAILED DESCRIPTION OF THE DRAWINGS

In FIG. 1, the numeral 1 connotes a partial cross-sectional view of the engine head, taken along the plane which contains the axis of an exhaust valve 2. The numeral 4 indicates a piston, numeral 5 a cylinder barrel, and numeral 6 crankcase, with numeral 7 being a spark plug.

The exhaust valve 2 is depicted in the figure in its position which corresponds to the closure thereof, so that valve head 21 mates a seating 8 as formed in the engine head: the valve is guided in its opening and closing motion by a guide 9 and is driven, with the intermediary of a cup 10 by camshaft 11, whereas 12 and 13 indicate valve springs. The air to be injected, coming from a specially provided pump driven by the engine (not shown in the drawing) comes through a manifold duct 14 to a duct 15 (corresponding to the cylinder shown in the drawing) and thus to an annular chamber 16 which is coaxial with valve stem 20. This chamber is formed, according to FIG. 1, in the cylinder head 1, but it could also be formed through the valve guide thickness. Through the thickness of the valve guide 9, bores 17 are formed, which have one end in communication with the chamber 16. In FIG. 1, that is in the position in which the exhaust valve 2 is closed, the bores 17 are closed, in correspondence with the other end, by the stem 20 of the valve 2, so that the flow of air to be injected is cut off. These details of the drawing are also seen in the two cross-sectional view of FIGS. 2 and 3. The annular chamber 18, formed by thinning out a portion of the stem 20 of the valve 2, is inoperative in the condition of FIG. 1, that is, when the exhaust valve is closed. When, conversely, the exhaust valve 2 is open, as is shown in FIG. 4, the chamber 18 enters into communication with the bores 17 so that, through these bores, the air to be injected can arrive at the chamber 18. As the exhaust valve 2 is open, the chamber 18 enters into communication also with the upper ends of ducts 19, which are formed by cutting grooves in the lower portion of the valve guide bore, since the lower end of the grooves 19 opens into exhaust duct 22 as the exhaust valve 2 is open, via the bore 15, the chamber 16, the bores 17, the chamber 18 and the grooves 19, the air coming from the pump is injected into the exhaust duct 22 so as to become admixed with the exhausts which arrive meanwhile from the explosion chamber. On account of the trend of the path of the exhausts as the exhaust valve 2 is open, also in relation with the angle of the valve seating, it should be noticed that the exhaust gases are just directed towards the bottom end of the valve guide 9 and thus towards the area where air is injected. Obviously, the grooves 19 are arranged in the interior of the valve guide 9 so as not to disturb the bores 17. The outline of the grooves 19 can be rectilinear, that is, along the generating lines of the cylindrical guide, but it can also be helical as shown at 19a (FIG. 6), if a discharge of a helical shape into the exhaust duct 22 encourages an immediate mixing. The design details mentioned in connection with FIG. 4 can also be seen in the cross-sectional view FIG. 5.

One of the advantages of the device as described above is the fact that the distance between the valve head 21 of the conventional exhaust valve 2 and the first contact area between the valve stem 20 and the valve guide 9 is not increased with respect to the conventional arrangement, along with the fact that the surface area of the first contact area aforesaid is not considerably decreased as compared with the conventional arrangement.

Another advantage is that the size of the stem 20 is not decreased with respect to the conventional size in the portion between the valve head 21 and the first contact area between the valve stem and the valve guide.

An additional advantage is that the spontaneous rotation of the exhaust valve about its own axis in operation does not introduce any variation of the magnitude and the direction of the injected air stream.

What is claimed is:

1. In an internal combustion engine having a cylinder head, at least a working cylinder in the head, a piston slidable in the working cylinder, an exhaust duct, an exhaust valve to vent exhaust gases from the cylinder to the exhaust duct, said exhaust valve having a head and a stem, the cylinder head having a bore, a valve guide in the bore to guide the stem of the exhaust valve, and a device for the timed injection of air into the exhaust duct, the device including at least a first duct, said first duct communicating with an air pressure source and having an outlet end, said outlet end being at the bore of the cylinder head in which the stem of the exhaust valve is slidably received, at least a second duct, said second duct being permanently connected with the exhaust duct and having an inlet end, said inlet end of the second duct being at the bore of the cylinder head for the stem of the exhaust valve, said first and second ducts being provided in the cylinder head and at least partially in the valve guide, said exhaust valve including a slide valve controlling the communication between the first and second ducts, the stem of the exhaust valve constituting the mobile member of the slide valve, the stem being provided with an annular groove, and the valve guide constituting the fixed member of the slide valve so that when the exhaust valve is opened, the first and second ducts are placed into communication through the annular groove.

2. The device as claimed in claim 1 including a duct provided in the cylinder head and permanently connected to an air pressure source, and annular chamber coaxial with the exhaust valve and provided in the cylinder head near the valve guide, a plurality of radial bores in the valve guide, the bores communicating with the duct via the annular chamber, at least a substantially longitudinal groove in the inner surface of the valve guide terminating at the end of the valve guide, in the exhaust duct, the annular groove of the exhaust valve stem being of a width at least equal to the operative stroke of the exhaust valve, and the longitudinal groove being located not to interfere with the bores of the valve guide and the annular groove of the stem when the exhaust valve is closed.

3. The device as claimed in claim 2 in which a plurality of longitudinal grooves are provided in the valve guide, the longitudinal grooves being alternatingly positioned with respect to the radial bores of the valve guide so there is no interference there between, and the length of the longitudinal grooves being such as to avoid any communication with the annular groove of the valve stem when the exhaust valve is closed.

4. The device as claimed in claim 2 in which helical grooves are provided in the valve guide, the helical grooves having inlet and outlet ends, the outlet ends being at the exhaust duct and the inlet end being positioned so that there is no interference with the radial bores and the annular groove when the exhaust valve is closed.

5. In an internal combustion engine having a cylinder head, at least a working cylinder in the cylinder head, a piston slidable in the working cylinder, an exhaust duct, an exhaust valve to vent exhaust gases from the cylinder to the exhaust duct, the exhaust valve having a head and a stem, a valve guide to guide the stem of the exhaust valve, the cylinder head having a first duct connected to an air pressure source, and a device for the timed injection of air from the first duct into the exhaust duct, the device including a slide valve having fixed and movable components, the movable component being an annular groove provided about an intermediate portion of the stem of the exhaust valve, the annular groove having a length substantially equal to the opening stroke of the exhaust valve, the fixed component being defined by an annular chamber in the cylinder head about the valve guide, said annular chamber being in communication with the first duct, one or more radial bores in the valve guide to provide communication between the annular chamber and the interior of the valve guide, and one or more longitudinal grooves in the interior of the valve guide, each longitudinal groove having inlet and outlet ends, the longitudinal grooves being arranged so as not to interfere with the radial bores, the outlet ends of the longitudinal grooves communicating with the exhaust duct, and the outlet of the radial bores and the inlet ends of the longitudinal grooves being disposed in a crownlike arrangement about the valve stem and slightly below the annular groove of the valve stem when the outlet valve is closed whereby the valve stem arrests injection of air from the first duct but when the exhaust valve is in the open position, air is injected from the first duct via the annular chamber, the radial bores, the annular groove and the longitudinal grooves into the exhaust duct.

* * * * *